March 16, 1948.   T. H. WINKELJOHN   2,437,901
SEALING RING
Filed Dec. 23, 1944

INVENTOR.
Thomas H. Winkeljohn
BY
Evans & McCoy
ATTORNEYS

Patented Mar. 16, 1948

2,437,901

UNITED STATES PATENT OFFICE 2,437,901

SEALING RING

Thomas H. Winkeljohn, Wabash, Ind., assignor to The General Tire & Rubber Company, Akron, Ohio, a corporation of Ohio Application December 23, 1944, Serial No. 569,471

1 Claim. (Cl. 288—2)

This invention relates to sealing rings for moving machine parts and more particularly to a ring of elastic and pliable material adapted to seal the annular space between concentric cylindrical surfaces such as the space between the external cylindrical surface of a shaft and a surrounding internal cylindrical wall of a housing or bearing.

The present invention has for its object to provide a sealing ring provided with spaced, oppositely disposed sealing edges which are adapted to prevent leakage of fluid in either direction along the surface of a shaft or other cylindrical member to which the ring is applied.

More specifically the present invention has for its object to provide a single, compact sealing ring that serves the purpose of two ordinary oppositely disposed sealing rings, the ring of the present invention being adapted to serve as a combined dust guard and oil seal, or as a seal for preventing leakage of liquid in either direction along a cylindrical surface. For example, the ring of the present invention may be used in washing machines for preventing leakage of soapy water from a tub into an adjacent gear housing and leakage of oil from the gear housing into the tub along the surface of an agitator shaft extending from the gear housing through a wall of the tub.

With the above and other objects in view the invention may be said to comprise the sealing ring as illustrated in the accompanying drawings, hereinafter described and particularly set forth in the appended claim, together with such variations and modifications thereof as will be apparent to one skilled in the art to which the invention pertains.

Reference should be had to the accompanying drawings forming a part of this specification, in which Fig. 1 is a side elevation of a ring embodying the invention, part of the ring being broken away and shown in section;

Figure 1:
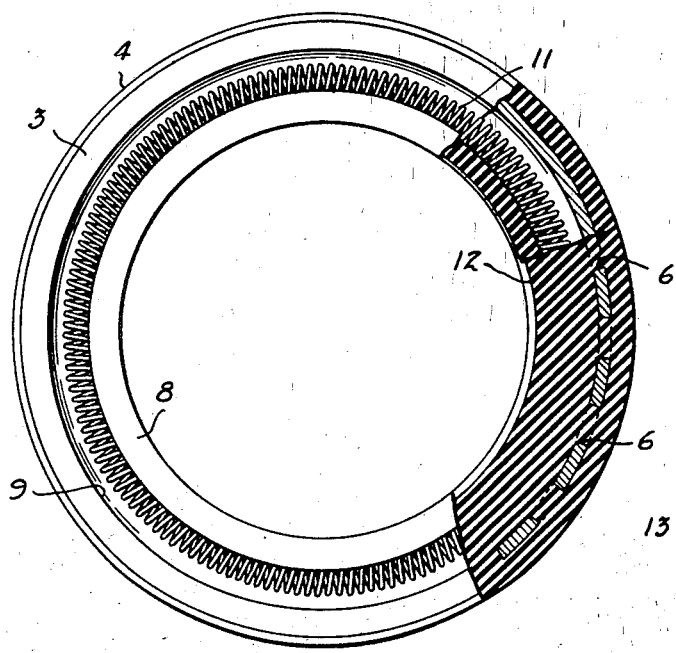
Figure 2:
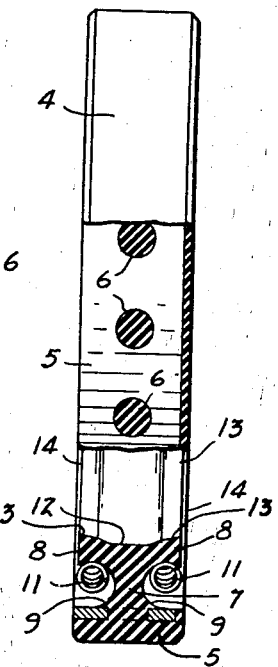
Fig. 2 is an edge view of the ring, a portion of which is broken away and shown in transverse section, and another portion of which is broken away to show the reinforcing ring.
Figure 3:
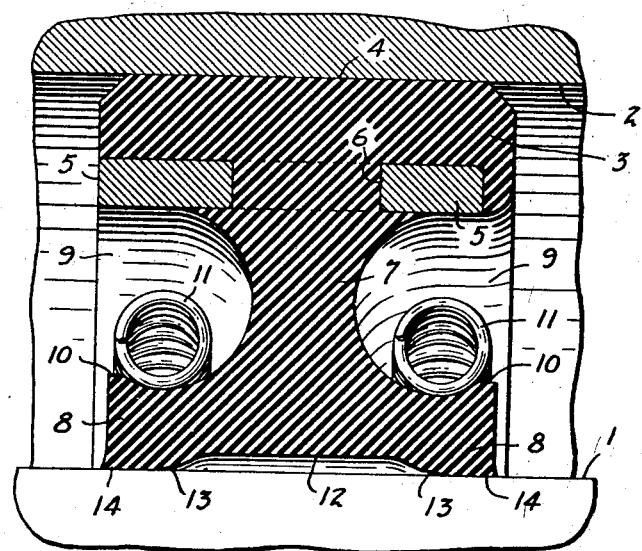
Fig. 3 is a transverse section on an enlarged scale, showing a ring in place between a shaft and the interior of an opening in the housing or bearing.

In the accompanying drawings the invention is shown applied in a space between a cylindrical shaft 1 and an internal cylindrical wall surface 2 of a bearing or housing through which the shaft passes. The sealing ring of the present invention is formed of an elastic and pliable material, such as natural or synthetic rubber and is provided with a positioning rim 3 that has a cylindrical outer face 4 adapted to fit within the cylindrical wall 2. The positioning rim 3 is reinforced by a cylindrical metal ring 5 that is imbedded within the positioning rim 3. The reinforcing ring 5 has a row of circumferentially spaced openings 6 therein and is embedded in the inner portion of the rim 3 so as to provide a relatively thick layer of elastic and pliable rubber outside the relatively rigid metal ring 5 so that the ring is adapted to conform to the configuration of an opening into which it is forced and to accommodate itself to openings of slightly different diameters. The ring is provided with a central flexible web 7 and lateral flanges 8 extending from the inner end of the web 7 and spaced inwardly from the opposite side portions of the rim 3, forming with the rim 3 channels 9 which open to opposite sides of the ring. Each of the flanges 8 is provided with a short inwardly projecting flange 10 at its outer edge which serves to position and retain an endless coil spring 11 which exerts a radial inward pressure on the flange.

The inner face of the sealing ring has a central recessed portion 12 and outwardly tapering internal conical face portions 13 on opposite sides of the recess 12 which extend to the outer edges of the flanges and meet the outer edge faces of the flanges at an acute angle to provide flexible sealing lips 14 engageable with the surface of the shaft 1. When the sealing ring is in place on the shaft the outer portions of the conical faces 13 are flattened and held against the surface of the shaft by the springs 11, providing an effective seal against the passage of fluid in either direction along the surface of the shaft to the central recessed portion of the ring.

The sealing ring of the present invention is adapted to seal oil in a bearing and also to effectively seal the bearing against the entry of dust or water. The sealing ring occupies considerably less space than would be occupied by two oppositely disposed sealing rings of conventional construction and is less expensive.

It is to be understood that variations and modifications of the specific device herein shown and described for purposes of illustration, may be made without departing from the spirit of the invention.

What I claim is:

A sealing ring for insertion between concentric cylindrical surfaces comprising a body of elastic and pliable material having a positioning rim with a cylindrical face engageable with one of said cylindrical surfaces, a flexible central web integral with the rim, flexible flanges extending laterally from said web and spaced radially from said rim to form channels opening to opposite sides of the ring, an endless cylindrical metal reinforcing ring having circumferentially spaced perforations, said ring being embedded in the inner portion of said positioning rim and overlying said web with its perforations alined with the web to firmly anchor said ring and to provide a relatively rigid rim with a layer of elastic material of substantial thickness exteriorly of said reinforcing ring, and springs exerting a radial pressure upon the inner faces of said flanges.

THOMAS H. WINKELJOHN.

REFERENCES CITED

The following references are of record in the file of this patent:

UNITED STATES PATENTS

| Number | Name | Date |
|---|---|---|
| 2,249,141 | Johnson | July 15, 1941 |
| 2,330,104 | Antonelli | Sept. 21, 1943 |

FOREIGN PATENTS

| Number | Country | Date |
|---|---|---|
| 544,881 | Great Britain | 1942 |
| 703,031 | Germany | 1941 |